United States Patent [19]
Testa, Jr.

[11] Patent Number: 5,305,544
[45] Date of Patent: Apr. 26, 1994

[54] BAIT STORAGE, COOLER AND TACKLE HOLDER ARRANGEMENT

[76] Inventor: Vincent M. Testa, Jr., 61 Ober St., Beverly, Mass. 01915

[21] Appl. No.: 48,894

[22] Filed: Apr. 16, 1993

[51] Int. Cl.[5] .............................. A01K 97/00
[52] U.S. Cl. ........................ 43/54.1; 43/57; 206/315.11
[58] Field of Search ............ 43/54.1, 55, 57, 57.1, 43/56; 206/315.11, 373; 220/521, 522, 523, 524, 23.83

[56] References Cited

U.S. PATENT DOCUMENTS

| | | | |
|---|---|---|---|
| 2,870,932 | 1/1959 | Davis | 220/521 |
| 3,191,337 | 6/1965 | Fant | 43/57 |
| 3,201,017 | 8/1965 | Morrissey | 206/315.11 |
| 3,751,845 | 8/1973 | Van Leeuwen | 43/56 |
| 3,835,575 | 9/1974 | Kelley et al. | 43/56 |
| 3,958,359 | 5/1976 | Doughty | 43/55 |
| 4,128,170 | 12/1978 | Elliott | 43/54.1 |
| 4,168,590 | 9/1979 | Beshoner, Sr. | 43/55 |
| 4,615,137 | 10/1986 | Radmanovich | 43/57 |
| 4,667,484 | 5/1987 | Tarozzi et al. | 220/521 |
| 4,936,043 | 6/1990 | Steele | 43/57 |
| 5,050,335 | 9/1991 | Hisey | 43/55 |
| 5,181,612 | 1/1993 | Liu | 220/521 |

*Primary Examiner*—Kurt C. Rowan
*Assistant Examiner*—Chuck Y. Mah
*Attorney, Agent, or Firm*—D. N. Halgren

[57] ABSTRACT

The present invention comprises a multi-compartment insulated chest for the fresh storage of bait and food. The chest has a lower portion which is divided into two compartments by a non-insulated wall. The chest has an upper portion which includes a lid and an upper storage area. The upper lid has a secondary hatch to permit access through the upper portion and directly into the lower bait portion. The upper may be separable from the lower portion and float next to a fisherman, connected thereto by a tether.

13 Claims, 4 Drawing Sheets

5,305,544

BAIT STORAGE, COOLER AND TACKLE HOLDER ARRANGEMENT

BACKGROUND OF THE INVENTION (1) Field of the Invention

This invention relates to bait containers having cooler and tackle housing compartments achieving a cooperative structure.

(2) Prior Art

Fisherman always have the problem of managing their gear and their bait in good, accessible condition. Bait should be kept relatively cool, as should other particulars. Gear should be accessible and consolidated with the fishermen's other necessities, (in particular weather advisory information and entertainment). The industry has not totally addressed these needs.

Patents showing some attempts in this include Beshoner, Sr. U.S. Pat. No. 4,168,590 which shows a portable live bait support container, no other capability is available here. However, U.S. Pat. No. 3,835,575 discloses a container having an insulated, aerated bait compartment above a tackle drawer. Hisey U.S. Pat. No. 5,050,335 shows a two compartment insulated container for holding bait, a removable wall acts as a central divider. U.S. Pat. No. 2,639,906 discloses a minnow box container with an external air pump for directing pressured air into the box through a pressure nozzle system. Radmanovich U.S. Pat. No. 4,615,137 discloses a live bait container having an aeration system which is capable of manual operation. U.S. Pat. No. 4,936,043 discloses a live bait container with a solar powered pump arrangement.

It is the object of the present invention however, to provide a fishermen bait and cooler arrangement not shown or contemplated by the prior art.

BRIEF SUMMARY OF THE INVENTION

The present invention comprises a fishermen containment chest for bait, food, tackle, weather advisory and entertainment in a common container. The container comprises an insulated cooler chest having a plurality of internal sections adapted for a particular use, which sections exist in a symbiotic relationship with the other sections.

The chest has a lower portion defined by four contiguous insulated walls and an insulated floor spanning the bottom of these walls. A non-insulated partition is disposed between a pair of these walls, to divide the larger portion of the chest into two sections, which are water impermeable with respect to one another, yet permit them to keep one another cool.

A first section is arranged for the maintenance of bait fish therein. The first section includes a sealed off chamber for a removable air pump and battery, the air pump having a supply conduit into the first section which has an air diffuser at the bottom thereof. The first section has a drain and rear door to provide access to the air pump and battery.

The second section of the lower portion of the chest is arranged to hold ice, food, beverages or caught fish, as desired.

The chest has an upper portion defined by four integral insulated walls having a lower peripheral edge which is matingly received into the upper peripheral edge of the walls of the lower portion.

The upper portion also has an upper lid or deck which has a hinge along one side thereof and attached to one of the side walls. The upper portion has a floor which extends generally across the lower part of the walls of the upper portion. An opening and chute is arranged through the floor of the upper portion to provide access to the bait containment section in the lower portion of the chest.

The upper portion also contains a removable tackle compartment and speakers arranged in the side walls of the upper portion for transmission of radio broadcast from a radio adapted in the upper portion.

The upper lid or deck has a second lid which is disposed over the chute in the floor of the upper portion to provide access to the bait section without opening the entire upper deck or lid. The deck or lid has a pair of depressions therein for holding beverages or food, the depressions are un-insulated as to help keep articles cool that are placed therein.

The Invention thus comprises a multi compartment bait and food containment chest for keeping such bait and food fresh and accessible, the chest comprising: a lower base compartment defining a first section and a second section, the sections for holding perishable items separated by a non-insulated partition, an upper portion matable with the lower base, the upper portion being separable from the lower base, and, the upper portion being floatable apart from the lower base, having multiple compartments therein for containment of accessories and perishables, and a bait portion of the lower base having an electric air pump therein to aerate any bait therein, the upper portion having an upper deck, a lower floor and a plurality of peripheral walls, the upper portion having a secondary lid arranged through the upper deck, the lower floor in the upper portion has an opening therethrough, to permit direct access through the upper portion into the bait portion in the lower base, a plurality of recesses therein for receiving and holding food or beverages therein, a radio receiver and loudspeaker arrangement therein, the recesses having thin uninsulated wall members to permit any food or beverages contained therein to be cooled by the cool interior of the chest. The air pump is in communication with an airstone for slowly releasing air into the bait section of the lower base. The chest includes a tether attached to said upper portion, for attachment to a user when the upper portion is floating in water.

BRIEF DESCRIPTIONS OF THE DRAWINGS

The objects and advantages of the present invention will become more apparent when viewed in conjunction with the following drawings in which.

DESCRIPTION OF THE PREFERRED EMBODIMENTS

Figure 1:
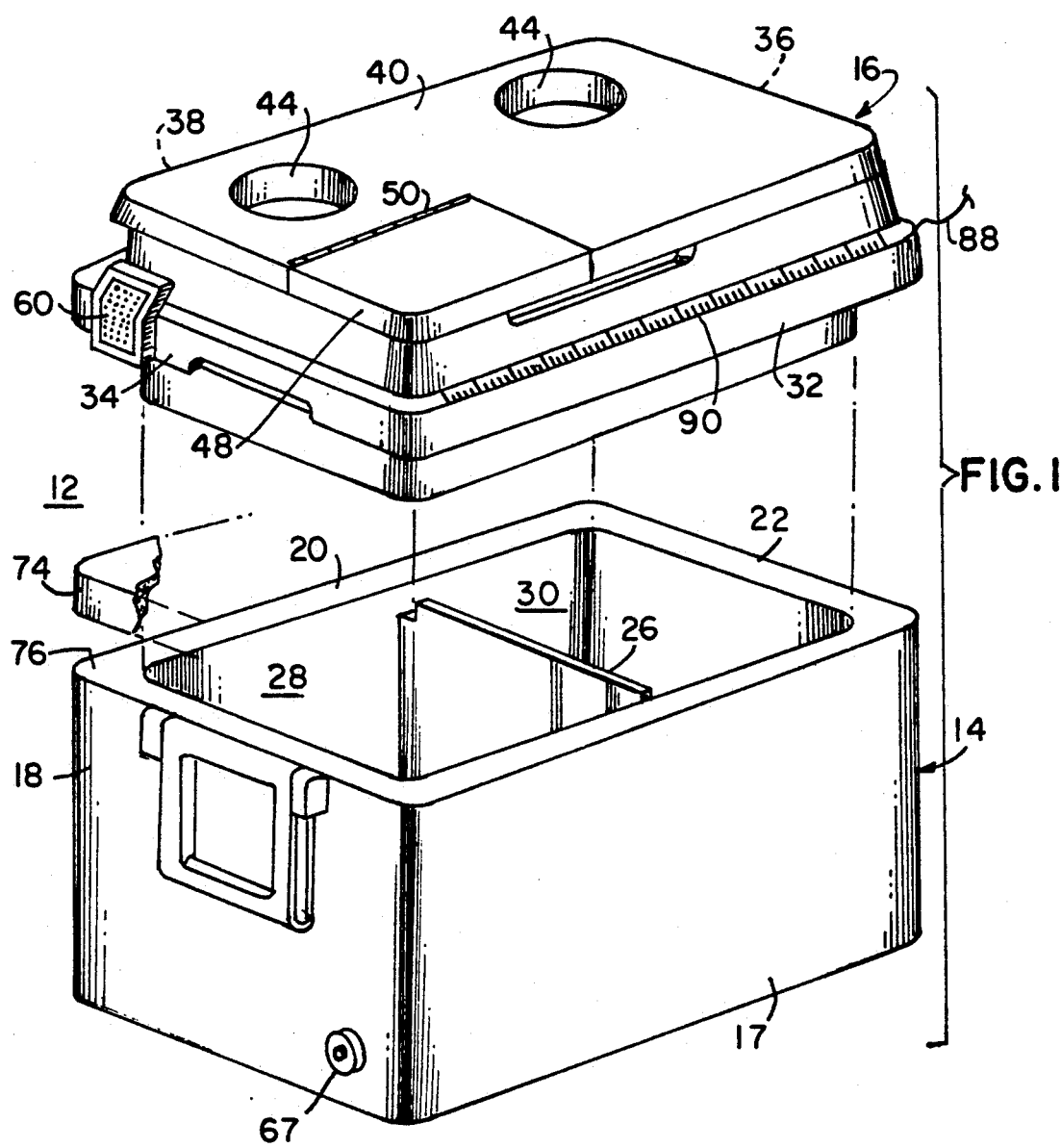
FIG. 1 is an exploded perspective view of the containment chest constructed according to the principles of the present invention.

Referring to the drawings now in detail and particularly to FIG. 1 there is shown a fishermen containment chest 12 having a lower base 14 and an upper removable portion 16.

Figure 3:
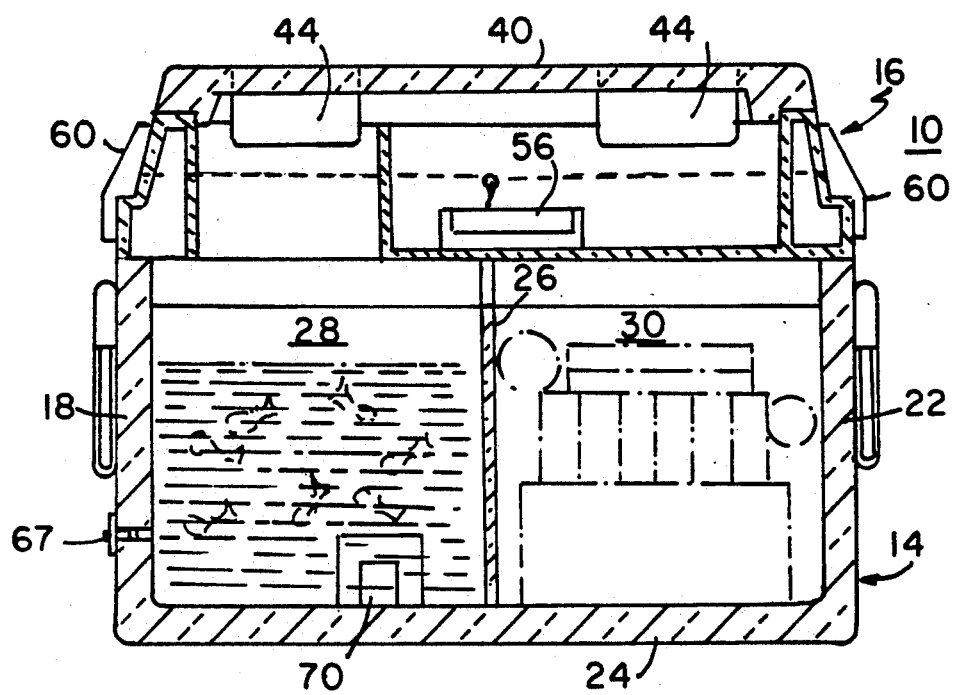
FIG. 3 is a side elevational view taken in section.

The lower base 14 is defined by a plurality of walls 17, 18, 20 and 22, and a base floor 24, shown in FIG. 3. A non-insulated partition 26, divides the lower base 14 into a bait portion 28 and a cool food portion 30.

The upper portion 16 is defined by a front wall 32, a pair of side walls 34 and 36, and a rear wall 38. The upper portion 16 has an upper deck 40 or main lid having a hinge 42 along its rear edge which is attached to the rear wall 38 of the upper portion 16.

The deck 40 has an arrangement of recesses 44 thereon. The recesses 44 are adapted to hold food or beverages therein. The recesses 44 may be formed of thin non-insulative plastic wall material 46 to permit any food or beverage placed therein remain cool, because of the cool conditions existing inside the chest 12.

The upper deck 40 has a hatch 48 or secondary lid having a hinge 50 along one edge thereof, as shown in FIG. 1, attached to the upper deck 40 or main lid.

The upper portion 16, has a floor 52 therein. The floor 52 has an opening 54 therethrough, having side walls 56 which extend vertically to water-tight engagement with the inside surface of the deck 40. The opening 54 permits access into the bait portion 28 of the lower base 14.

The hatch 48 is in vertical alignment with the opening 54 so as to permit access to the bait portion 28 of the lower base 14 right through the upper portion 16.

Figure 2:
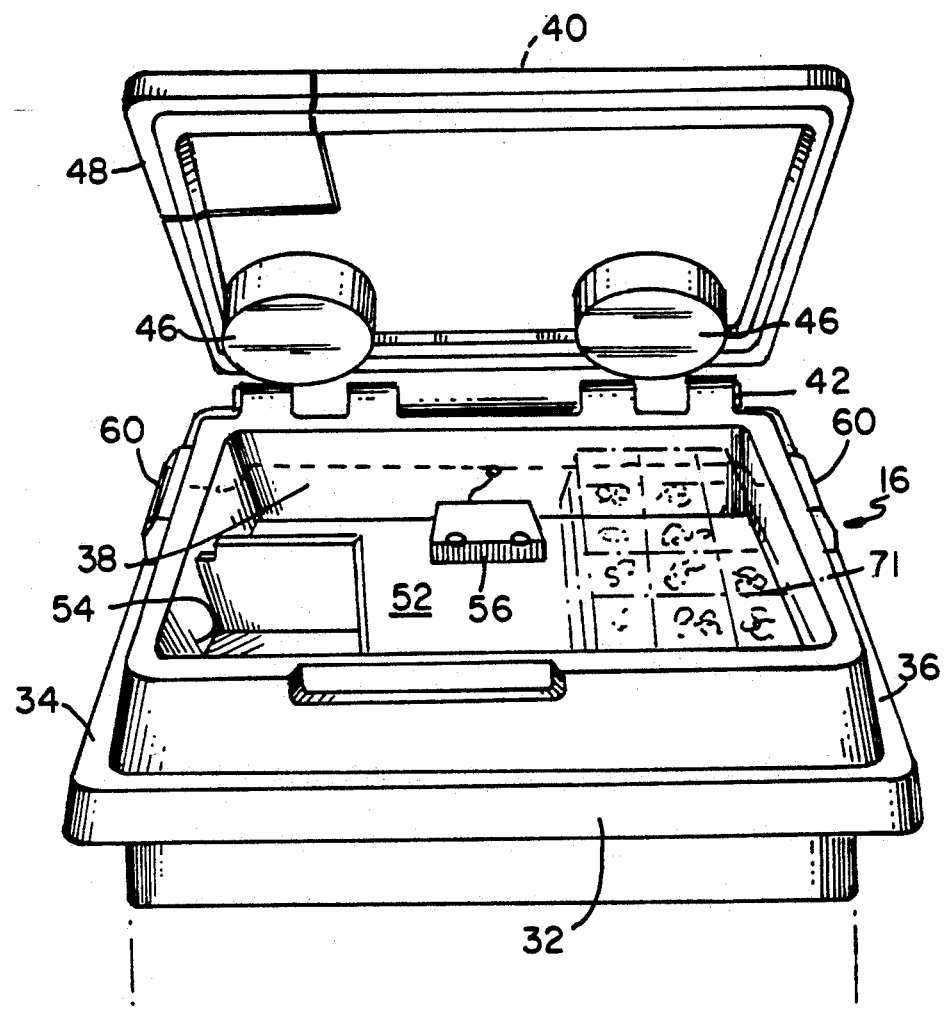
FIG. 2 is a perspective frontal view of the containment chest with its lid in an open configuration.

The upper portion 16 has a radio receiver 56 arranged in the floor 52, as shown in FIG. 2, in communication with a pair of water resistant loudspeakers 60, as shown in FIGS. 1, 2 and 3. A removable tackle box 71 is arranged within the upper portion 16, as shown in FIG. 2.

Figure 4:
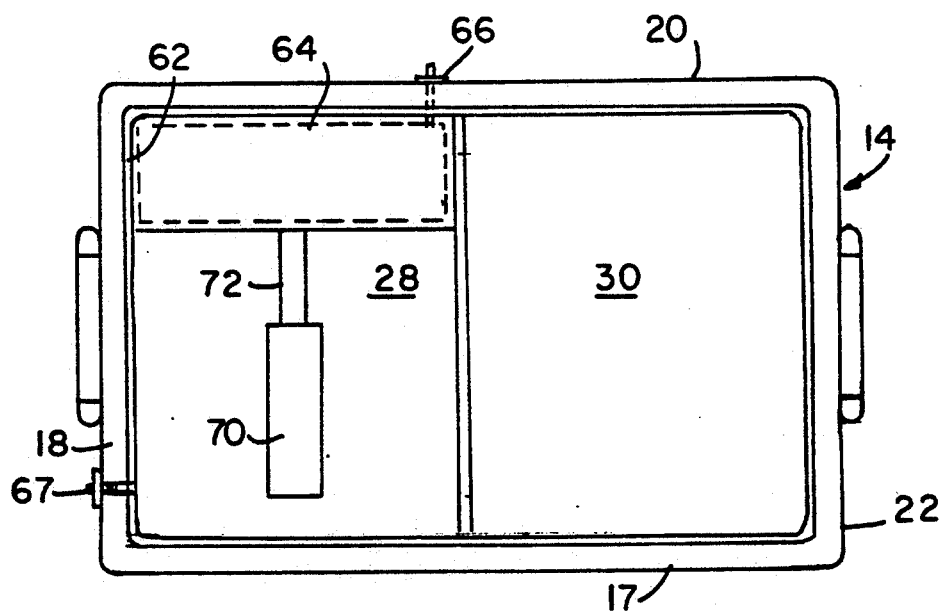
FIG. 4 is a plan view of the lower portion.
Figure 5:
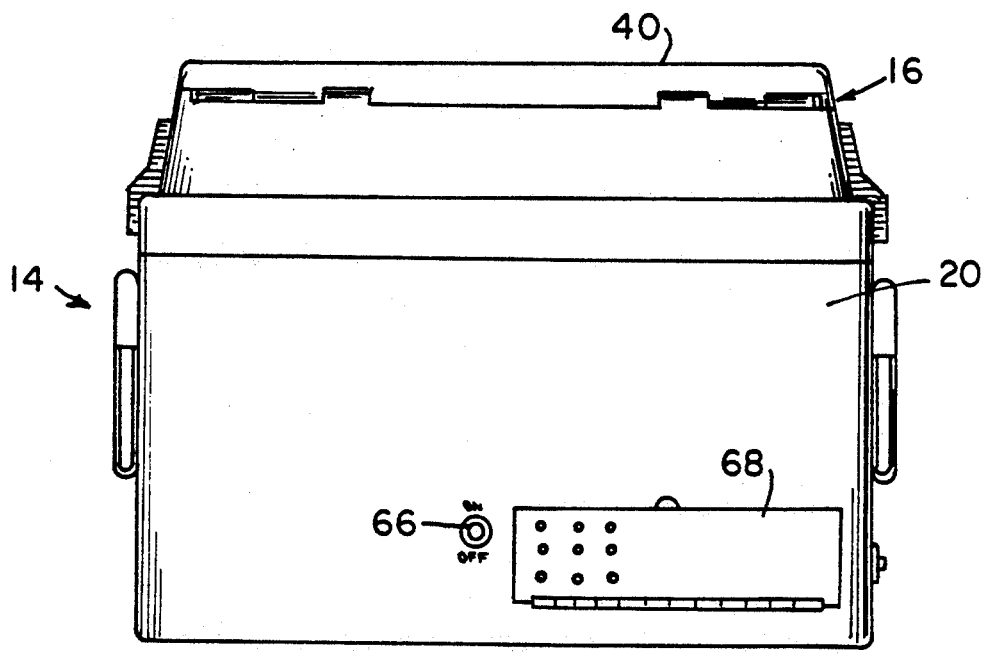
FIG. 5 is a rear elevation view of the containment chest.

The bait portion 28 has a chamber 62 extending across its lower rear edge, as shown in FIG. 4. The chamber 62 contains a removable air pump 64 and includes a battery, all activatable by a switch 66, as shown in FIG. 5. The chamber 62 has a door 68 accessable from the rear of the chest 12. The air pump 64 is in fluid communication with an air stone 70 through a tube 72, utilized to keep bait fish fresh therein. The air pump 64 and battery, not shown may be removed for use in other containers. A screened petcock 67 is arranged in the side wall 18, to permit drainage of water from the bait chamber 28, while keeping the bait from escaping.

An intermediate cover 74, may be placed over the upper peripheral edge 76 of the base 14 to keep it covered to the outside.

The cooler food portion 30 may have ice or cooler packs held therein. This will help keep the bait portion 28 cool as well, because the non-insulated partition 26 permits the maintenance of cool temperatures within both the bait and food portions 28 and 30.

The upper portion 16 has its walls 32, 34, 36 and 38 made of closed cell polymeric material which permits it to float. The upper portion 16 may have a tether 88 which is clippable to a fisherman standing in water, to permit him access to bait and or refreshment supported thereon. An inch scale 90 is molded into the front wall 3 on the front of the upper portion 16.

Thus what has been shown is a multi-purpose fisherman's chest, capable of maintaining bait fresh, food cool, and nearby as well, when the fisherman is in the water.

I claim:

1. A multi compartment bait and food containment chest for keeping such bait and food fresh and accessible, said chest comprising:
    a lower base compartment defining a first bait section and a second section, said sections for holding perishable items separated by a non-insulated partition;
    an upper portion matable with said lower base, said upper portion being separable from said lower base;
    said upper portion being floatable apart from said lower base, having multiple compartments therein for containment of accessories and perishables;
    said upper portion having an upper deck, a lower floor and a plurality of peripheral walls, said upper portion having a secondary lid arranged through said upper deck; and
    said lower floor in said upper portion having an opening therethrough, to permit direct access through said upper portion into said bait portion in said lower base.

2. A multi compartment bait and food containment chest as recited in claim 1, wherein said bait portion of said lower base has an electric air pump therein to aerate any bait therein.

3. A multi-compartment bait and food containment chest as recited in claim 2, wherein said air pump is in communication with an airstone for slowly releasing air into said bait section of said lower base.

4. A multi compartment bait and food containment chest as recited in claim 2, wherein said upper deck has a plurality of recesses therein for receiving and holding food or beverages therein.

5. A multi compartment bait and food containment chest as recited in claim 4, wherein said upper portion has a radio receiver and loudspeaker arrangement therein.

6. A multi compartment bait and food containment chest as recited in claim 4, wherein said recesses have thin uninsulated wall members to permit any food or beverages contained therein to be cooled in the interior of said chest.

7. A multi compartment bait and food containment chest as recited in claim 1, including a tether attached to said upper floatable portion, for attachment to a user to prevent it from floating away from a user in water.

8. A multi compartment bait and food containment chest for holding bait and food cool and fresh, comprising:
    a lower base portion;
    a floatable upper portion having food holding means on an upper surface thereof, said upper portion having an inner compartment for holding of supplies; said upper surface having an openable lid therethrough; and
    said floatable upper portion has a lower floor therein, said lower floor having an opening therethrough in vertical alignment with said openable lid.

9. A multi compartment bait and food containment chest as recited in claim 8, wherein said opening in said lower floor has a wall extending therearound, and into water tight abutting contact with the lower side of said upper surface when said upper portion is closed.

10. A multi compartment bait and food containment chest as recited in claim 9, wherein said lower base is divided into a bait portion and a food portion by a non-insulative partition.

11. A multi compartment bait and food containment chest as recited in claim 10, wherein said bait portion has a removable electric air pump arranged therein for aerating any bait therein.

12. A multi compartment bait and food containment chest as recited in claim 10, included a screened petcock to permit drainage of said bait portion without losing bait therefrom.

13. A multi compartment bait and food containment chest as recited in claim 10, whereon said upper portion has a removable tackle box therein.

* * * * *